United States Patent
Jordan

[11] Patent Number: 6,067,784
[45] Date of Patent: May 30, 2000

[54] HARD FACING FOR CUTTING EDGES OF AGRICULTURAL MACHINE BLADES

[75] Inventor: Reinhard Jordan, Purgstall, Austria

[73] Assignee: Busatis GmbH, Purgstall, Austria

[21] Appl. No.: 09/067,892

[22] Filed: Apr. 28, 1998

[30] Foreign Application Priority Data

Apr. 28, 1997 [AT] Austria .................................. A733/97

[51] Int. Cl.$^7$ .......................... A01D 45/02; A01D 34/13; B25G 3/00; B26B 9/00
[52] U.S. Cl. .................................. 56/102; 56/53; 56/289; 56/DIG. 17; 56/DIG. 20; 30/345; 30/350
[58] Field of Search ................................ 56/53, 102, 289, 56/296, 299, DIG. 17, DIG. 20; 30/345, 350, DIG. 5, 121.5, 309, 347; 76/82.1

[56] References Cited

U.S. PATENT DOCUMENTS

| | | |
|---|---|---|
| 3,647,401 | 3/1972 | Meadows ................................ 29/182.8 |
| 3,660,050 | 5/1972 | Iler et al. ................................ 29/182.8 |
| 3,989,554 | 11/1976 | Wisler ....................................... 285/333 |
| 4,488,882 | 12/1984 | Dausinger et al. ........................ 51/295 |
| 4,697,320 | 10/1987 | Ishihara et al. ............................ 29/132 |
| 4,836,307 | 6/1989 | Keshavan et al. ...................... 175/374 |
| 4,945,640 | 8/1990 | Garg et al. ................................. 30/350 |
| 5,069,872 | 12/1991 | Penoza ...................................... 420/436 |
| 5,096,465 | 3/1992 | Chen et al. ................................. 51/295 |
| 5,351,588 | 10/1994 | Penoza ......................................... 83/13 |
| 5,544,643 | 8/1996 | Bauer et al. ............................... 125/12 |
| 5,791,422 | 8/1998 | Liang et al. .............................. 175/374 |

FOREIGN PATENT DOCUMENTS 2 176 683   1/1987   United Kingdom .

*Primary Examiner*—Eileen Dunn Lillis
*Assistant Examiner*—Gary S. Hartmann
*Attorney, Agent, or Firm*—Herbert Dubno

[57] ABSTRACT

A hard facing for an agricultural machine blade which contains hard particles of 40 to 100 μm in particle size and a hardness of greater than 1400 HV in a matrix with hardness of 500 to 800 HV.

10 Claims, 4 Drawing Sheets

HARD FACING FOR CUTTING EDGES OF AGRICULTURAL MACHINE BLADES

FIELD OF THE INVENTION

The present invention relates to hard facing for knives, blades or the like and, more particularly, for the flank of a cutting edge of a blade for an agricultural machine. The invention relates, more particularly, to a hard facing coating of the type in which a hard material in particulate form is embedded in a matrix material. The invention also relates to knives, blades and cutting edges provided with such a hard facing coating.

BACKGROUND OF THE INVENTION

For various cutting purposes, agricultural harvesting machinery, especially choppers, utilized blades and knives which on the nonbevelled flank, are coated with a hard facing material. The hard facing material can be applied by a thermal spraying process in two stages. In a first stage, the coating is deposited by a flame spraying, plasma spraying or a like technique whereas the bonding is improved by a second stage thermal treatment which involves a fusion or sintering.

The layer can be composed of a metal matrix and a hard material, especially tungsten carbide, which is incorporated in the matrix.

The HV value for the carbide is usually 2 to 3 times greater than the corresponding value for the matrix and the hardness value for the matrix can be approximately equal to that of the underlying material or the substrate, for example, steel.

Because of the hardness differences between the hard facing layer and the substrate material, the blade suffers from a difference in wear, with the softer substrate material wearing more rapidly than the hard facing. At the cutting edge, a portion of the hard facing material may project beyond the substrate material so that the blade has a self sharpening effect in use.

Harvesting machines of the type described have been required to have greater productivity in recent years and the wear resistance of previous hard facing materials have not met the newly applied standards. Under high productivity conditions, the wear of the hard facing layer is more pronounced and the hard facing material may not project beyond the substrate material so that, rather than a self sharpening effect, there may be a rounding of the cutting edge. It, therefore, is essential to increase the resistance to wear of the hard facing material.

OBJECTS OF THE INVENTION

It is the principal object of the present invention to provide an improved hard facing material which will have reduced wear by comparison with hard facing materials used heretofore, especially for agricultural machinery blades.

Another object of the invention is to obviate the disadvantages of earlier hard facing systems, especially for the blades of agricultural machinery and, more specifically, for field harvesters and choppers.

Still another object of the invention is to provide a blade or knife for a field harvester or chopper which has a long operating life, a resistance to rounding and a self sharpening effect.

SUMMARY OF THE INVENTION

These objects and others which will become apparent hereinafter are attained, in accordance with the invention, in a hard facing, especially for an agricultural machine blade, wherein the hard material particles embedded in the matrix material of the hard facing have diameters of 40 to 100 $\mu$m. Particles of this size range contribute a greater wear resistance to the hard facing. While the regions of the hard facing between the hard material particles have a significantly lower hardness and a greater wear, the hard material particles have very high wear resistance and the coated edge can sustain a significantly higher useful life by comparison with blades or cutting edges of prior art types.

Preferably, the hard materials particles with a particle size of 40 to 100 $\mu$m, make up at least 30% of a polished section of the hard facing material.

This minimum proportion of hard material particles insures, especially when the hard material particles are uniformly distributed in the matrix phase, that the regions between the particles and composed of matrix phase are not excessively large and thus prevents a massive hollowing out of the matrix material between the hard material particles.

Preferably the hard material particles have a hardness greater than 1400 HV so that the overall hardness of the hard facing coating is also approximately in this range and the wear resistance is correspondingly increased.

The hard material particles are preferably carbides, nitrides or oxides of metals such as tungsten, titanium, vanadium and zirconium, with tungsten carbide being preferable. Preferably the matrix material has a hardness of 500 to 800 HV and contains nickel or cobalt or alloys thereof or alloys of nickel and cobalt or nickel-chromium-silicon compounds. While such matrix materials are known in the art, they have been found to be particularly effective when the hard materials are tungsten carbide in the particle size range of 40 to 100 $\mu$m.

Preferably the optimum thickness of the hard facing material can be selected based upon the proportion and hardness of the hard material particles in the coating, the matrix hardness and the useful width of the coating material. The following thickness parameters have been found to apply:

For the chopping of corn, the hard facing material should have a thickness of 0.1 to a maximum of 0.2 mm.

For the chopping of grass and other silage plants, the hard facing material thickness should be at least 0.3 and at most 0.5 mm.

For the cutting blade or knife in a corn chopper, the hard facing material thickness should be at least 0.6 and at most 1.5 mm.

With the above specified structure of the hard facing material in the preferred thickness, the blades, knives and cutting edges provided with the hard facing coating have useful lives which are especially suitable for modern agricultural machinery.

BRIEF DESCRIPTION OF THE DRAWING

The above and other objects, features, and advantages will become more readily apparent from the following description, reference being made to the accompanying drawing in which.

SPECIFIC DESCRIPTION

The term "polished section" as used herein is intended to refer to a photomicrograph of a portion of a material which has been found and polished to show the grain structure or particle structure in cross section in whatever matrix the particulate material may be embedded.

Figure 1:
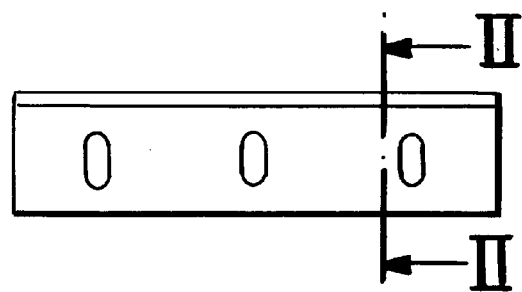
FIG. 1 is an elevational view of a chopper blade embodying the present invention.
Figure 2:
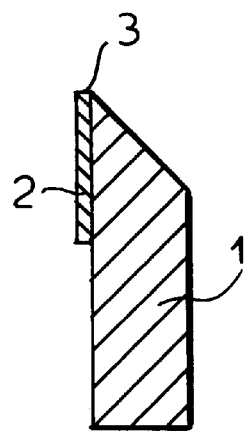
FIG. 2 is a cross sectional view taken along the line II—II of FIG. 1 drawn to a larger scale.
Figure 3:
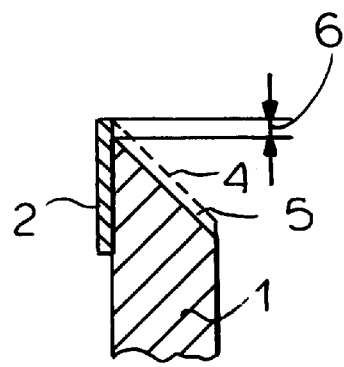
FIG. 3 is a section of the chopper blade of FIG. 2 after use and showing the effect of a sufficiently hard hard facing layer.

In FIGS. 1 and 2, we have shown a chopper blade which comprises the substrate 1 having a beveled edge and composed, for example, of steel. On the substrate material a hard facing coating 2 is applied which reaches to the cutting edge 3. The hard facing material is applied to the nonbevelled flank defining the cutting edge 3 as can be seen in FIG. 2. In the region of the coating 2, the base material of the substrate 1 is hardened. FIG. 3 shows the wear of the base material of the substrate from its original contour 4 to the contour 5 which results in the hard facing 2 projecting by a distance 6 beyond the blade substrate.

Figure 3A:
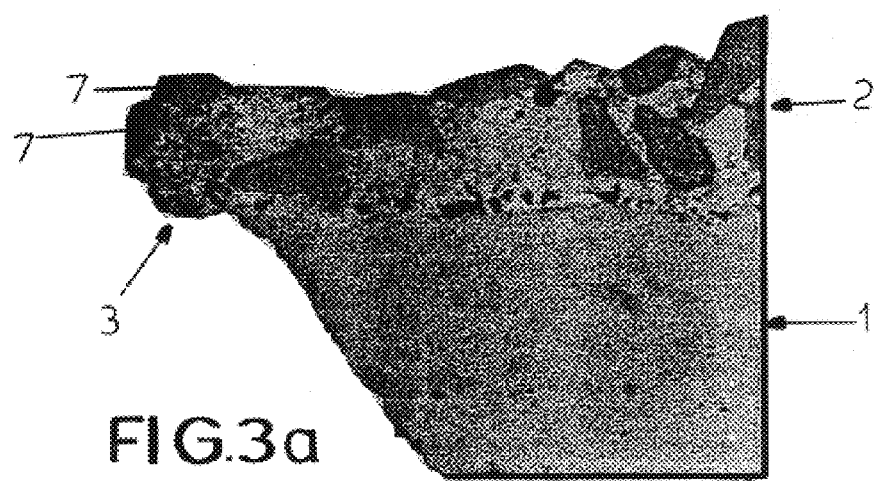
FIG. 3a is a polished section of a hard facing layer according to FIG. 3.

FIG. 3a represents a polished section through the projecting portion of the coating 2 beyond the substrate 1. In the projecting tip of the coating 2, it is possible to recognize two carbides 7 which provide the coating with the wear resistance and contribute the hardness to the overall coating 2 which corresponds to that of the carbides.

Figure 4:
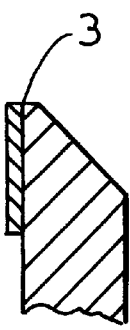
FIG. 4 is a section similar to FIG. 2 but of a blade after use in the case in which the hard facing layer has an insufficient hardness.

FIG. 4 shows the case in which the wear of the coating is excessive, i.e. the wear of the coating is not materially less than that of the base material.

Figure 4A:
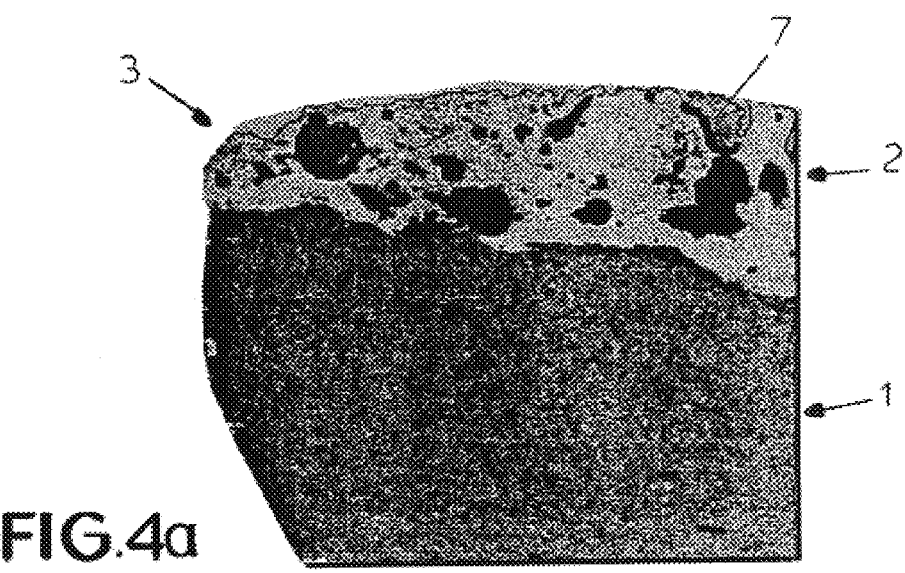
FIGS. 4a and 4b are ground or polished section in a photomicrograph.
Figure 4B:
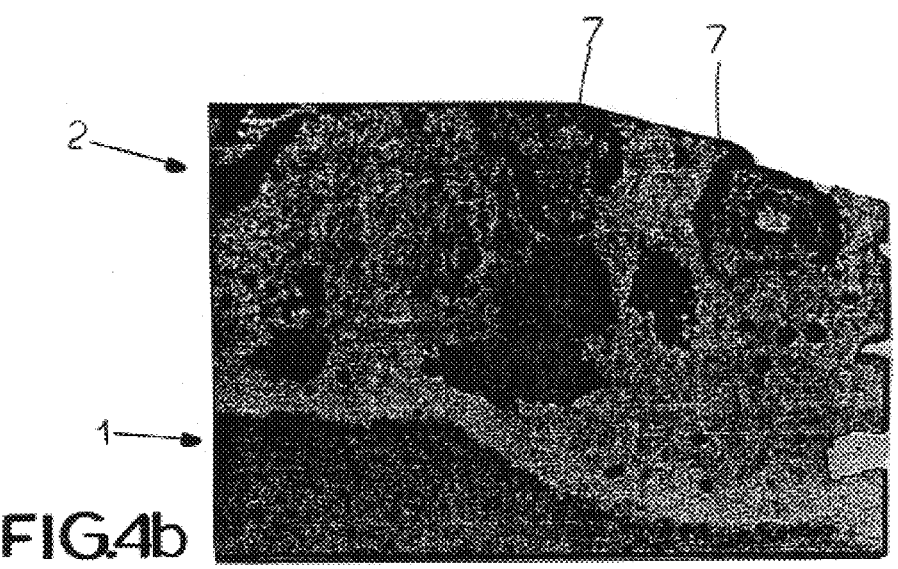

The result is a rounding off of the edge. This case is illustrated in FIG. 4a in a polished section in which compact carbides are seen in the matrix phase but the carbides are not of sufficient particle size. In the detail of FIG. 4b, only two larger size particles 7 are visible while the remaining carbide particles are dispersed in the matrix phase and do not materially contribute to the wear resistance.

The dark specks in the polished sections are pores.

Figure 5:
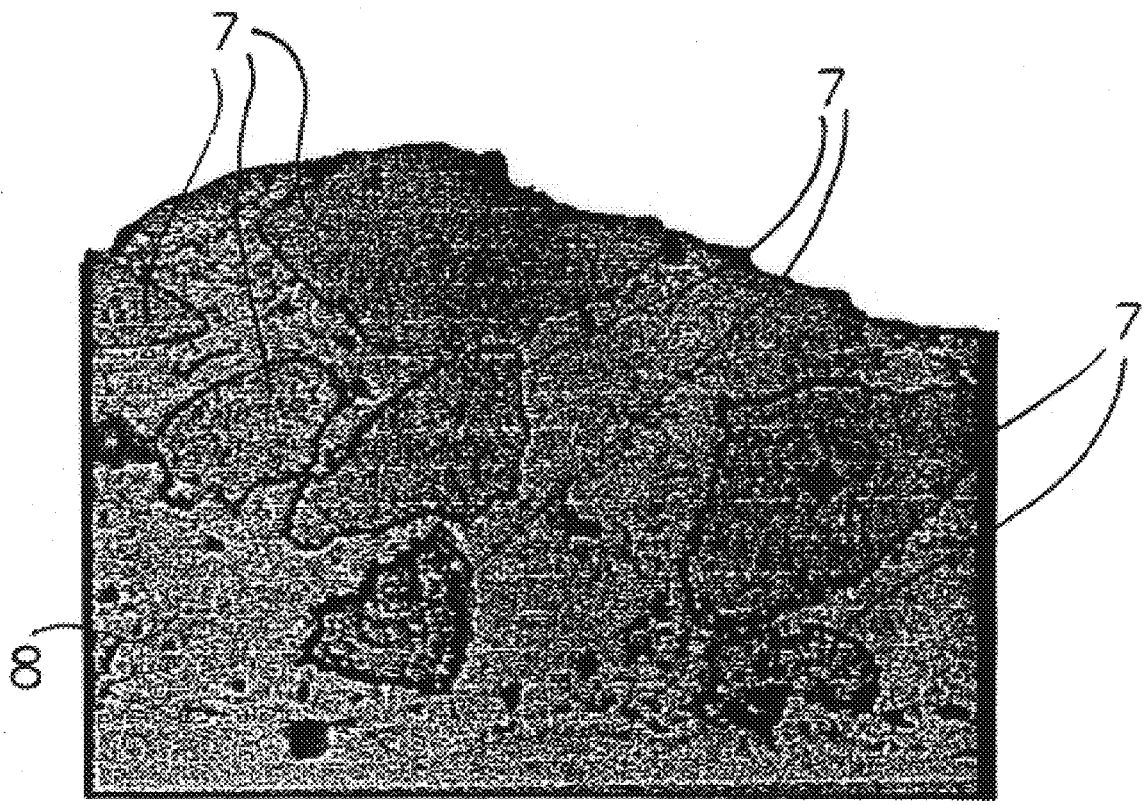
FIG. 5 is a polished section of a hard facing coating according to the invention.
Figure 6:
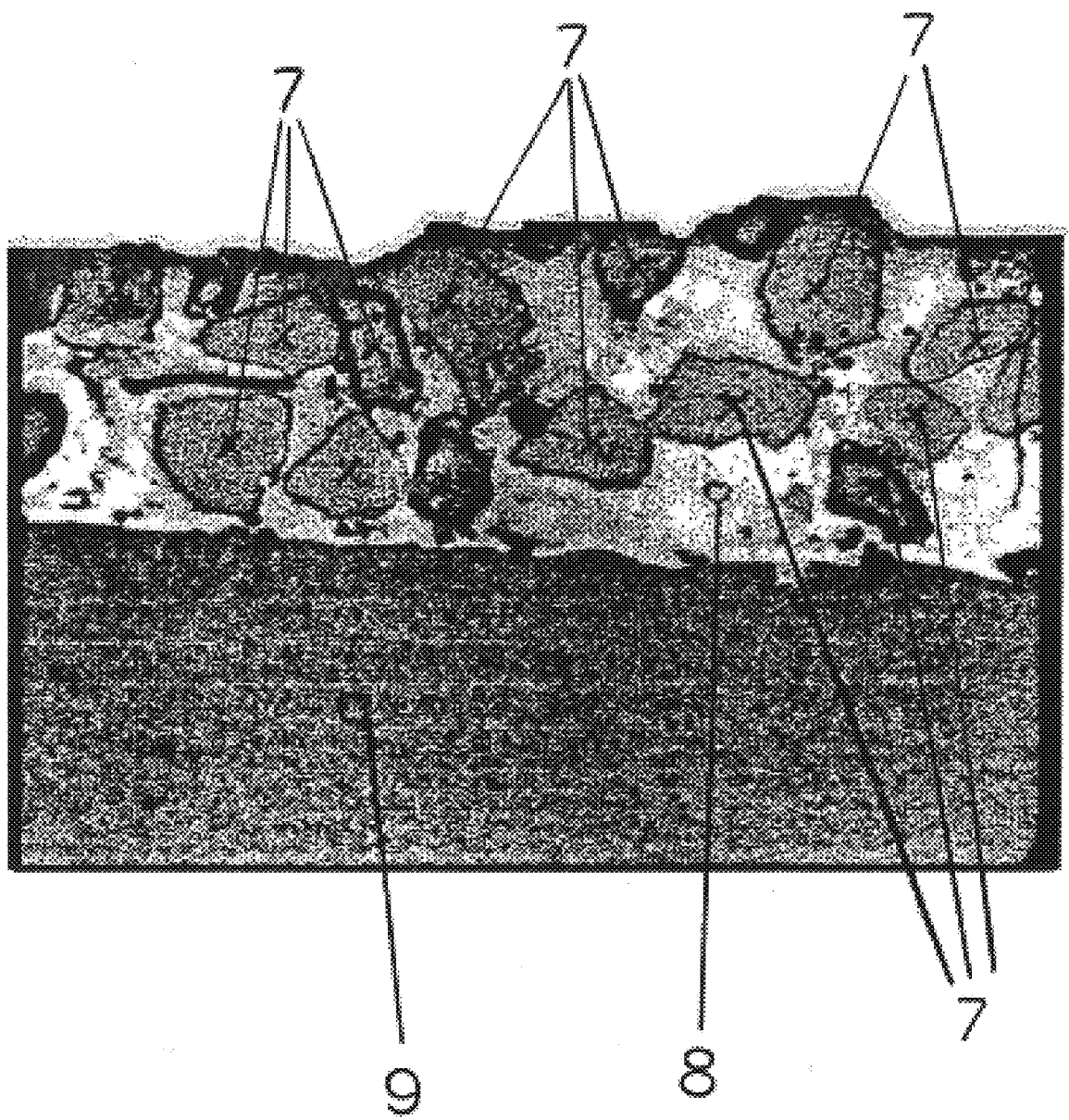
FIG. 6 is a polished section in a photomicrograph of a blade provided with the hard facing coating according to the invention.

The structural difference between the prior art coatings (FIGS. 4a and 4b) and the polished sections with the larger carbide particles of the invention were all of the carbide particles are in the 40 to 100 $\mu$m range, can be seen from the contrast between FIGS. 4a and 4b representing the prior art and FIGS. 5 and 6 representing the invention.

In the coating of FIGS. 5 and 6 practically all of the carbide particles are of the larger size. The base material for the blade is shown at 9 in FIG. 6. The hardness of the coating is determined by the large carbide particles 7 which do not define the edge. Only when these carbide particles wear sufficiently or break away, is the matrix material then worn downwardly until new carbide grains 7 lie at the cutting edge, thereby restoring the hardness to that of the carbides.

To produce a cutting blade in accordance with the invention, a heat treatable steel AISI 1450 is used and the blade shape is formed by stamping. The bevel is produced by milling or grinding. The region to be provided with the hard facing coating is roughened by sandblasting to a metallically bright surface and then subjected to flame spraying with a neutral oxyacetylene flame with 50 l/min oxygen consumption. The two component metal powder deposit is comprised of a self-flowing chromium boron and silicon alloyed nickel matrix with a particle size of 25 to 125 $\mu$m with the hard material particles being tungsten carbide with a particle size of 40 to 105 $\mu$m. The weight proportion was 40% matrix and 60% tungsten carbide. In a further process stage, the hard facing, which was deposited in multiple layers to the desired thickness, was sintered in a furnace at 1100° C. to increase the bond strength of the coating. In the case of a corn-chopping blade, the coating was deposited to a thickness of 0.15 mm. In the case of a grass silage, the coating was deposited to a thickness of 0.4 mm and for a counterblade cooperating with a corn-chopping blade the coating was deposited to a thickness of 1 mm. The particles of tungsten carbide with a particle size of 40 to 100 $\mu$m had a hardness of at least 1400 HV and made up a minimum of 50% of the area of a polished section of the hard facing material. The matrix material had a hardness of 700 HV.

I claim:

1. An agricultural crop chopping machine blade having a cutting edge and provided with a hard facing coating, said hard facing coating comprising hard-material particles with a diameter of 40 to 100 $\mu$m uniformly distributed in a matrix material, said hard material particles having a hardness of at least 1400 HV, and said hard-material particles making up in area at least 30% of a polished section of the hard facing.

2. The blade defined in claim 1 wherein said hard-material particles with a diameter of 40 to 100 $\mu$m are composed of a carbide, nitride or oxide.

3. The blade defined in claim 2 wherein said hard-material particles with a diameter of 40 to 100 $\mu$m are composed of tungsten carbide.

4. The blade defined in claim 3 wherein said matrix material has a hardness of 500 to 800 HV.

5. The blade defined in claim 4 wherein said matrix material is nickel, cobalt or a nickel-chromium-silicon compound.

6. The blade defined in claim 5 in the form of a corn-chopping blade having a thickness from 0.1 to 0.2 mm.

7. The blade defined in claim 5 in the form of a grass silage chopping blade wherein the hard facing has a thickness from 0.3 to 0.5 mm.

8. The blade defined in claim 5 in the form of a counterblade cooperating with a corn-chopping blade and wherein the hard facing has a thickness of 0.6 mm to 1.5 mm.

9. A blade for a field harvester, said blade having a cutting edge and provided with a hard facing coating in a thickness of 0.1 to 0.2 mm for a corn-chopping blade, a thickness of 0.3 to 0.5 mm for a grass silage blade or a thickness of 0.6 to 1.5 mm for a counterblade for a corn chopper, said hard facing coating comprising hard-material particles of a hardness of at least 1400 HV with a diameter of 40 to 100 $\mu$m in a matrix material having a hardness of 500 to 800 HV, said hard-material particles with a diameter of 40 to 100 $\mu$m making up in area at least 30% of a polished section of the hard facing.

10. The blade defined in claim 9 wherein said hard-material particles are composed of tungsten carbide and said matrix material is selected from the group which consists of nickel, cobalt, alloys thereof and nickel-chromium-silicon compounds.

* * * * *